July 14, 1964 L. GOODMAN Re. 25,618

MULTI-WALL INSULATING RECEPTACLE

Original Filed July 21, 1959 2 Sheets-Sheet 1

MULTI-WALL INSULATING RECEPTACLE

Original Filed July 21, 1959 2 Sheets-Sheet 2

United States Patent Office

Re. 25,618
Reissued July 14, 1964

25,618

MULTI-WALL INSULATING RECEPTACLE

Leonard Goodman, Kings Point, N.Y., assignor to Foster Grant Co., Inc., Leominster, Mass., a corporation of Delaware Original No. 3,082,900, dated Mar. 26, 1963, Ser. No. 828,550, July 21, 1959. Application for reissue June 20, 1963, Ser. No. 295,263
8 Claims. (Cl. 220—15)

Matter enclosed in heavy brackets [ ] appears in the original patent but forms no part of this reissue specification; matter printed in italics indicates the additions made by reissue.

This invention relates to a multi-wall, viz. double-wall, insulating and substantially rigid receptacle adapted to be used as a drinking cup for serving either hot or cold liquids.

Copending with this application is the application Serial No. 828,542 of Jack Bloch simultaneously filed with, and having the same assignee as, this application on July 21, 1959, entitled, "Fluted Insulating Receptacle."

Heretofore, multi-wall receptacles adapted for use as drinking cups have been formed from treated paper web materials or from organic plastic materials and have included mechanical structural component features such as mating circumferential bead structures or lip and groove sealing structures as means for interengaging or fitting one vessel or container within another vessel to form a double-wall receptacle or container, and, in addition, such prior multi-wall receptacles have included circumferential bead structures for ensuring interengagement of the nested or interfitted vessels. Generally speaking, with respect to heretofore known receptacles of this nature fabricated from treated or untreated paper or organic plastic materials, the lip portions of the respective vessels are rolled to form such circumferentially extending bead structures. As to the prior art treated or untreated paper multi-wall receptacles and to those receptacles around which are positioned a fixedly attached coaster-type holding means, additional securing means such as straps or adhesive compositions applied to various portions of one or both component parts are required to ensure interengagement of said parts. In those prior art multi-wall receptacles fabricated from organic plastic materials such as polyethylene, generally speaking, the respective inner and outer component vessels have smooth side walls of relatively large thickness to ensure rigidity, and this especially at the portions thereof having mating lip and groove sealing structures. With respect to those prior art multi-wall receptacles fabricated from organic plastic materials adapted to be used as drinking cups where it has not been desirable to remove periodically the inner vessel from the outer vessel, the respective inner and outer vessels likewise have, generally speaking, smooth side walls and the permanent engagement of the respective vessels has been brought about by the use of adhesive compositions.

From the foregoing, it is readily apparent with respect to those prior art multi-wall receptacles, particularly those adapted for use as drinking cups for the partaking of hot or cold liquids, fabricated from organic plastic materials that where good thermal insulating characteristics are obtained rigidity of said structure is usually sacrificed and that rigidity such as that attained with a multi-wall receptacle fabricated from an inorganic material such as ordinary glass is not obtained. For example, the organic plastic materials generally utilized are flexible and resilient but distortable and are, when used to fabricate the smooth-wall vessels which make up the multi-wall receptacle, readily and easily distortable. As is quite apparent, with such readily and easily distortable side walls, the outer vessel side wall is easily and readily urged into contact with the inner vessel side wall upon handling during the partaking of the contents thereof.

I here provide for the first time organic plastic material multi-wall receptacles, adapted to be used as drinking cups, which are both thermally insulating and rigid during handling in the partaking of the contents thereof.

The multi-wall thermally insulating and rigid receptacle of my invention comprises a cup-shaped outer vessel and a substantially similarly shaped inner vessel positioned within the outer vessel, each being fabricated of an organic plastic material. The outer vessel has side wall flutes, preferably for the greater portion of its height, thereby adding strength to the overall structure and thereby forming a plurality of substantially adjacent similarly shaped air spaces between the respective side walls of the vessels and an air space between the respective bottom walls of the vessels. The lowermost portions of the flutes can or cannot touch the outer side wall surface of the inner vessel. In every instance where said lowermost portions do contact said surface, the component structure becomes more rigid, and this is so whether said lowermost portions contact said surface in the structure as formed or in the structure as used. [The] *Suitably, the* outer vessel has an outwardly turned or extending substantially flat lip therearound at its top edge, and the inner vessel also has an outwardly turned or extending substantially flat lip therearound at its top edge complementary with respect to said outer vessel lip. In combination, the inner vessel flat lip is in contact with and positioned directly adjacent to said outer vessel lip and attached, preferably by heat sealing, to said outer vessel lip. In assembling the two vessels, the inner vessel is merely inserted within the outer vessel, and the inner vessel circumferentially outwardly extending lip is positioned over and contacts at all points of its bottom surface the circumferentially outwardly extending outer vessel lip, thereby being suspended in and positioned in said outer vessel. Also within the scope of my invention are included circumferentially extending fluted structures.

The materials of construction of my multi-wall receptacle are organic plastic materials including thermoplastic materials, and a preferred material is polystyrene. For example, one of the vessels can be formed from general purpose polystyrene and the other vessel can be formed from high impact strength polystyrene, or both vessels can be fabricated from said high impact strength polystyrene. High impact polystyrene includes a physical blend of polystyrene and natural or synthetic rubber and a graft copolymer of styrene upon a synthetic or natural rubber, the synthetic or natural rubber being present in the amount of approximately three to twenty, and preferably about seven, percent, the impact strength [oft his] *of this* material, viz. the number of foot-pounds required for the fracture of a test specimen in accordance with the widely accepted Izod test for the determination of impact strength, being between 0.3 and 1.5 and preferably between 1.0 and 1.2.

An object of my invention is to provide a high strength multi-wall insulating and rigid receptacle adapted to be used as a drinking cup from an organic plastic material which effectively thermally insulates the cup contents and is rigid during handling.

Another object of my invention is to provide a high strength multi-wall insulating drinking cup which can be easily and economically produced and still be strong and rigid during use.

Other objects and features will become readily apparent from the following detailed description which is not intended to be limiting but is set forth merely to show the preferred embodiments.

Figure 1:
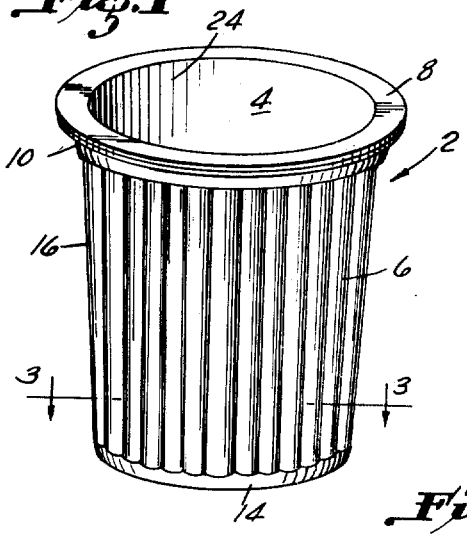
FIGURE 1 is a view in perspective of one embodiment of my multi-wall insulating drinking cup.
Figure 2:
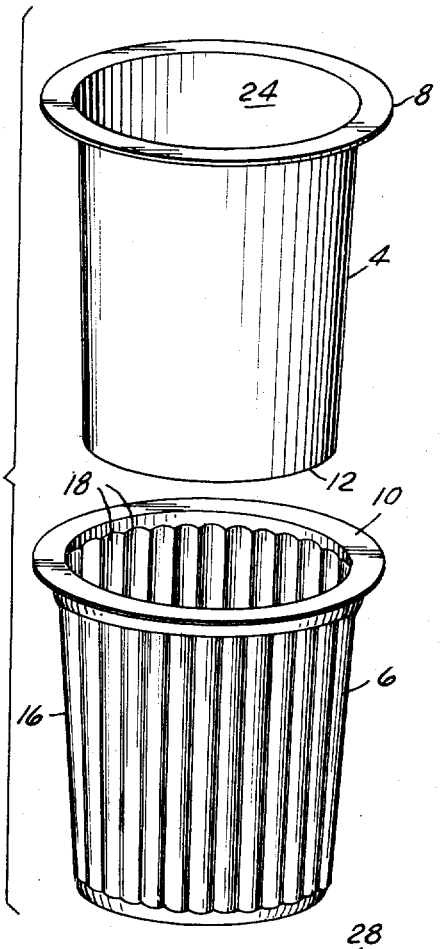
FIGURE 2 is an exploded view of my multi-wall insulating drinking cup shown in FIGURE 1.

More specifically, with respect to the embodiment of FIGURE 1, multi-wall cup 2 consists of the inner vessel 4 and the outer vessel 6, each preferably being substantially cylindrically shaped. Said inner vessel 4 and said outer vessel 6 are similarly shaped, as is clearly shown in the appended drawings. Integral with the inner vessel 4 is the circumferentially outwardly extending substantially flat lip 8, and integral with the outer vessel 6 is the circumferentially extending substantially flat lip 10 complementary with respect to lip 8 and in contact with and attached to lip 8. The bottom wall 12 of inner vessel 4 is preferably flat, as shown, but can be otherwise shaped, and the bottom wall 14 of the outer vessel 6 is preferably concave, as clearly shown in the appended drawings, but may be otherwise shaped.

Figure 6:
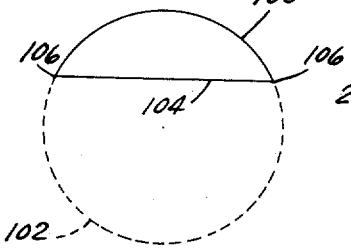
FIGURE 6 is a showing of a segment of a circle.
Figure 5:
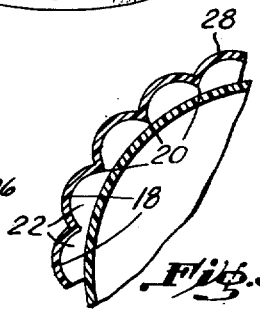
FIGURE 5 is an enlarged fragmentary sectional view similar to that of FIGURE 3.

The side wall 16 of outer vessel 6 is provided with outwardly vertically extending flutes 18. Each of said flutes 18 has the configuration of an equal segment of the same circle, as clearly shown, and the edges 20, 20 of each flute substantially coincides with the respective edge of the directly adjacent flute 18. Now, with respect to FIGURE 6, the segment 100 of circle 102 is clearly shown, the segment 100 being shown in a full line and the circle 102 being shown in dotted lines. The chord 104 of segment 100 is shown by a full line, and said segment 100 has the lowermost edges 106, 106. FIGURE 6 is here introduced merely for purpose of clearly explaining the configuration of said outwardly extending flutes 18. Each of said flutes 18 has the configuration of segment 100, and there are thereby formed the plurality of air spaces 22 between the respective side walls 16 and 24 of the outer and inner vessels 6 and 4 and the air space 26 between the bottom walls 14 and 12. As is clearly shown in the appended drawings, the innermost and outermost portion 28 of each outwardly extending flute is spaced from the wall 24 of inner vessel 4. The edges 20, 20 may or may not contact the side wall 24 of the inner vessel 4. In every instance where said edges 20 do contact the side wall 24, as formed, the composite receptacle will be rigid and in those instances where said edges 20 do not contact the side wall 24, as formed, the composite receptacle will also be rigid and, in handling, will attain greater rigidity by reason of the fact that the edges 20 will be urged into contact with side wall 24. Thus, the outer surface of the outer vessel 6 presents for molding the multi-wall cup 2 a substantially greater area to the holder of the cup while, at the same time, providing a larger air space volume than ordinarily obtainable with the prior corrugated cups.

As is clearly evident here, the air spaces 22 and air space 26 provide a highly efficient thermally insulating volume between the inner and outer vessels. Also, the cup still retains rigidity, mechanical strength, and resistance to breaking upon handling by reason of the use of both the organic plastic material as a material of construction and the fluted structure, and this in spite of the fact that the side and bottom walls of the respective inner and outer vessels are relatively thin and also more so when the edges 20 are urged into contact with the side wall 24.

In addition, the inner and outer vessels can be easily and economically assembled by reason of the presence of the respective lips, as herinabove described. In assembling the multi-wall cup 2 of my invention, the inner and outer vessels [are formed by well known molding procedures and apparatus] *4 and 6 are formed by employing known plastic molding procedures and apparatuses such as those denominated "vacuum" and "pressure" forming capable of forming the thin seamless walls of the respective vessels 4 and* 6. The inner vessel 4 is then merely positioned within outer vessel 6 and remains suspended therein by reason of the lip 8 being positioned on and in contact with lip 10, and the lip 8 is then joined to lip 10.

As is clearly noted in the appended drawings, referring to the embodiment of FIGURE 1, the flutes 18 are substantially directed adjacent to each other and are substantially similarly shaped and are outwardly extending with respect to the side wall of the inner vessel 4.

Figure 7:
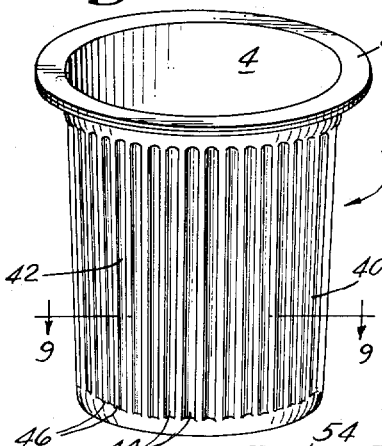
FIGURE 7 is a view in perspective of another embodiment of my multi-wall insulating drinking cup.
Figure 8:
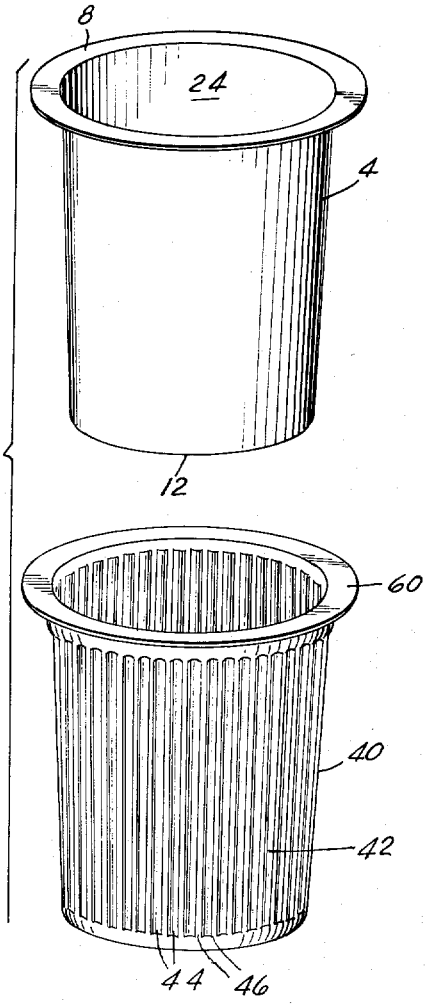
FIGURE 8 is an exploded view of the embodiment of FIGURE 7.

Referring to the embodiment of FIGURE 7, the multi-wall cup 36 consists of the inner vessel 4 and the outer vessel 40, each of said vessels being substantially cylindrically shaped as clearly shown in the appended drawings. The cup 36 of this embodiment, as is clearly evident, also has, as component parts thereof, the inner vessel 4 having the circumferentially outwardly extending substantially flat lip 8 and the bottom wall 12. However, the side wall 42 of the outer vessel 40 is provided with spaced apart inwardly vertically extending flutes 44, preferably curved, as clearly shown in FIGURE 9. Positioned between said flutes 44 are the vertically extending lands 46, thereby forming the air spaces 48 between the side wall 42 of outer vessel 40 and the side wall 24 of the inner vessel 4. Also, there are thereby formed the air spaces 52 between the lowermost portion 54 of flutes 44 and the hand holding the cup 36 at the lands [46]. As, in the embodiment of FIGURE 1, here the bottom wall 12 of inner vessel 4 is preferably flat, and the bottom wall 56 of outer vessel 40 is preferably concave, thereby forming therebetween air space 58. Integral with outer vessel 40 is the circumferentially extending substantially flat lip 60 complementary with respect to lip 8 and in contact with and attached, for example, as by heat sealing, to lip 8. The lowermost portions 54 may or may not contact the side wall 24 of inner vessel 4.

As in the embodiment of FIGURE 1, the inner and outer vessels of the embodiment of FIGURE 7 can be easily and economically assembled by reason of the respective lips, as hereinabove described.

Figure 3:
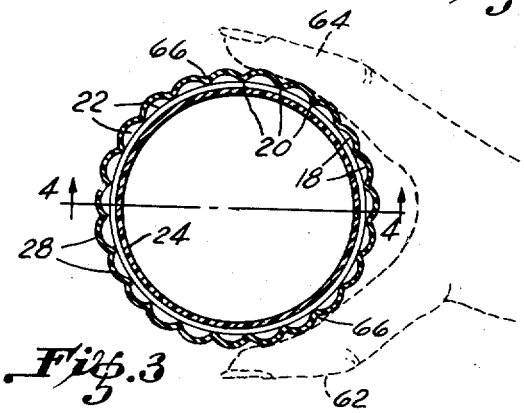
FIGURE 3 is a sectional view taken on line 3—3 of FIGURE 1.
Figure 4:
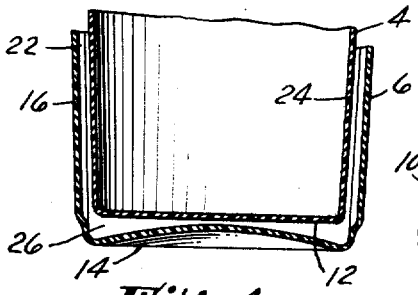
FIGURE 4 is a fragmentary sectional view taken on line 4—4 of FIGURE 3.
Figure 9:
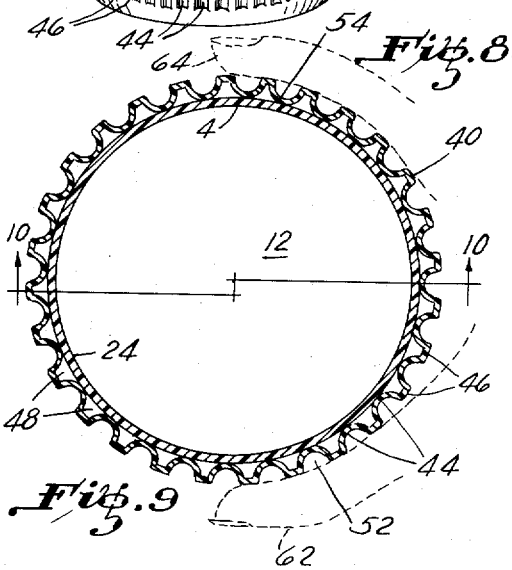
FIGURE 9 is a sectional view taken on line 9—9 of FIGURE 7.
Figure 10:
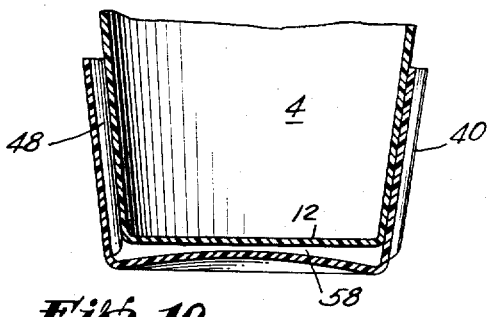
FIGURE 10 is a fragmentary sectional view taken on line 10—10 of FIGURE 9.

In the partaking of the contents from the multi-wall receptacles of my invention, the hand of the individual so partaking is positioned about the outer vessel as clearly shown by dotted lines in FIGURES 3 and 9, the thumb 62 and the forefinger 64 of the right hand of the holder being positioned as therein shown. In the embodiment of FIGURE 1, the thumb, on one hand, and the forefinger and other fingers of the holding hand, on the other hand, exert respective opposing forces against the lowermost portions 28 of the outwardly extending flutes 18 thereby causing the edges 20, 20 to touch the side wall 24 of inner vessel 4. Between the holding hand and portions of the flutes 18 are air spaces 66, thereby further thermally insulating the holding hand from the contents thereof. Also, as is clearly apparent, the flutes 18 add strength and lend rigidity to the overall combination, especially during handling of same.

Likewise, with respect to the embodiment of FIGURE 7, during the partaking of the contents from the multi-wall receptacle 40, the thumb 62, on one hand, and the forefinger and other fingers of the holding hand, on the other hand, exert respective opposing forces against the lands 46 thereby causing the innermost and outermost portions 54 of flutes 44 to touch the side wall 24 of inner vessel 4 thereby lending additional rigidity to the composite structure. Between the holding hand and the flutes 44 are the air spaces 52, thereby further thermally insulating the holding hand from the contents thereof. Again, as is clearly apparent, the flutes 44 add strength and lend rigidity to the overall combination, especially during handling of same.

As is clearly obvious, the configuration and dimensions of the flutes in the outer vessel of my multi-wall receptacle are capable of change depending upon the nature of the contents to be confined therein. For example, the depth of the respective flutes can be increased or decreased as can the distance therebetween, thereby changing the volume of the air spaces therearound and thereby changing the distance from the holding hand to the contents therein.

Many changes and alterations may be made without departing from the spirit and scope of this invention which is set forth in the appended claims which are to be construed as broadly as possible in view of the prior art.

I claim:

1. A multi-wall thermally insulating and substantially rigid receptacle adapted to be used as a drinking cup, comprising, in combination, an organic plastic material cup-shaped outer vessel having a bottom wall and a substantially similarly shaped organic plastic material cup-shaped inner vessel having a bottom wall and being suspendedly positioned within said outer vessel, said respective bottom walls being spaced from each other, said outer vessel having an outwardly turned substantially flat lip and said inner vessel having an outwardly turned substantially flat lip complementary with respect to said lip of said outer vessel, said outer vessel lip being in contact with and fixedly attached to, at its top surface, said inner vessel lip, at its bottom surface, said outer vessel having side wall adjacent shaped flutes for at least a portion of its height, whereby there are formed a plurality of shaped air spaces between the respective side walls of the vessels and an air space between the respective bottom walls of the vessels and a plurality of shaped air spaces between the outer vessel and the hand holding said receptacle thereby thermally insulating the contents of the receptacle from the hand holding it and whereby said flutes add strength and rigidity to the receptacle.

2. A multi-wall thermally insulating and substantially rigid receptacle adapted to be used as a drinking cup, comprising, in combination, an organic plastic material cup-shaped outer vessel having a bottom wall and a substantially similarly shaped organic plastic material cup-shaped inner vessel having a bottom wall and being suspendedly positioned within said outer vessel, said respective bottom walls being spaced from each other, said outer vessel having an outwardly turned substantially flat lip and said inner vessel having an outwardly turned substantially flat lip complementary with respect to said lip of said outer vessel, said outer vessel lip being in contact with and fixedly attached to, at its top surface, said inner vessel lip, at its bottom surface, said outer vessel having side wall adjacent shaped flutes for at least a portion of its height and being spaced from said inner vessel, whereby there are formed a plurality of shaped air spaces between the respective side walls of the vessels and an air space between the respective bottom walls of the vessels and a plurality of shaped air spaces between the outer vessel and the hand holding said receptacle thereby thermally insulating the contents of the receptacle from the hand holding it and whereby said flutes add strength and rigidity to the receptacle.

3. A multi-wall thermally insulating and substantially rigid receptacle adapted to be used as a drinking cup, comprising, in combination, an organic plastic material cup-shaped outer vessel including side wall adjacent shaped flutes for at least a portion of its height and a substantially similarly shaped organic plastic material cup-shaped inner vessel suspendedly positioned within said outer vessel, and having a plurality of shaped air spaces between the respective side walls of said vessels and an air space between the respective bottom walls of the vessels, said outer vessel having an outwardly turned substantially flat lip at its top and said inner vessel having an outwardly turned substantially flat lip at its top complementary with respect to and in contact with and fixedly attached to said outer vessel lip, whereby the contents of the receptacle is thermally insulated from the hand holding it and whereby said flutes add strength and rigidity to the receptacle.

4. A multi-wall thermally insulating and substantially rigid receptacle adapted to be used as a drinking cup, comprising, in combination, a substantially cylindrical organic plastic material outer vessel including side wall adjacent shaped flutes for at least a portion of its height and a substantially cylindrical organic plastic material inner vessel suspendedly positioned within said outer vessel, and having a plurality of shaped air spaces between the respective vessel side walls and an air space between the respective vessel bottom walls, said outer vessel having an outwardly turned substantially flat lip at its top and said inner vessel having an outwardly turned substantially flat lip at its top complementary with respect to and in contact with and fixedly attached to said outer vessel lip, whereby the contents of the receptacle is thermally insulated from the hand holding it and whereby said flutes add strength and rigidity to the receptacle.

5. A multi-wall thermally insulating and substantially rigid receptacle adapted to be used as a drinking cup, comprising, in combination, an organic plastic material cup-shaped outer shell having a substantially flat outwardly turned lip and an organic plastic material cup-shaped liner suspendedly positioned in said outer shell, said liner having a substantially flat outwardly turned lip positioned against and fixedly attached to the outer shell lip, said outer shell having side wall adjacent shaped flutes for at least a portion of its height, said outer shell being spaced from said liner at the side and bottom walls thereof, whereby there are formed a plurality of shaped air spaces between the respective side walls of the vessels and an air space between the respective bottom walls of the vessels thereby thermally insulating the contents of the receptacle from the hand holding it and whereby said flutes add strength and rigidity to the receptacle.

6. A multi-wall thermally insulating and substantially rigid receptacle adapted to be used as a drinking cup, comprising, in combination, an organic plastic material cup-shaped outer shell having a substantially flat outwardly turned lip and an organic plastic material cup-shaped liner suspendedly positioned in said outer shell, said liner having a substantially flat outwardly turned lip positioned against and fixedly attached to the outer shell lip, the organic plastic material of one of the outer shell and the liner being high impact strength polystyrene, said outer shell having side wall adjacent shaped flutes for at least a portion of its height, said outer shell being spaced from said liner at the side and bottom walls thereof, whereby there are formed a plurality of shaped air spaces between the respective side walls of the vessels and an air space between the respective bottom walls of the vessels thereby thermally insulating the contents of the receptacle from the hand holding it and whereby said flutes add strength and rigidity to the receptacle.

*7. A disposable double wall receptacle comprising: inner and outer vessels of thin-wall seamless construction formed of organic plastic and attached one to the other to form a unitary receptacle; said inner vessel having a bottom and a sidewall; said inner vessel sidewall terminating in a top portion; said outer vessel having a bottom and a sidewall; said outer vessel sidewall having shaped*

*adjacent flutes extending over a lower portion of the height of said sidewall and having a top portion extending over a minor portion of the height of said sidewall; the flutes of said outer sidewall being in a juxtaposition with relation to said inner vessel sidewall; said flutes forming a series of air spaces positioned between the vessels and a series of air spaces positioned between the outer vessel and the hand holding the receptacle; said flutes merging into said outer vessel top portion; said flutes and the air spaces formed thereby characterized by thermally insulating the contents of the receptacle from the hand holding the receptacle; at least a part of said outer vessel top portion being in circumferential contiguous relationship with at least a part of said inner vessel top portion to prevent free communication of the defined air spaces of the flutes with the atmosphere; said sidewalls of the vessels being of such thinness and construction so as to provide substantial mechanical stability yet to permit the urging inwardly of said outer vessel sidewall to close any space separating the innermost portions thereof and the inner vessel sidewall upon normal grasping by the hand of the holder.*

*8. A double wall receptacle comprising: inner and outer vessels of thin-wall seamless construction formed of organic plastic and attached one to the other to form a unitary receptacle; said inner vessel having a bottom portion and a substantially smooth sidewall portion; said inner vessel sidewall portion terminating in a lip extending outwardly of the wall of the outer vessel; said outer vessel having a bottom portion, and a sidewall portion of substantially the same thickness as the inner vessel*

*sidewall portion; said sidewall portion of said outer vessel comprising a series of vertical flutes extending from the bottom of the outer vessel to a point adjacent the top of the outer vessel and forming a series of air spaces between the inner and outer vessels; said flutes merging at the top thereof into a smooth portion extending circumferentially of said receptacle; said outer vessel smooth portion terminating in a lip extending outwardly of said smooth portion and being adapted to underlie at least a portion of said outwardly extending lip of said inner vessel; said lip of said outer vessel being in contiguous relationship with said lip of said inner vessel so as to prevent free communication of the air spaces with the atmosphere; said sidewall portions of said vessels being of such thinness so as to normally provide substantial mechanical stability while permitting the innermost portions of said flutes to be urged into contact with said sidewall portions of said inner vessel to close any space existing therebetween upon normal grasping by the hand of the holder.*

References Cited in the file of this patent or the original patent

UNITED STATES PATENTS

| | | |
|---|---|---|
| 1,771,765 | Benson | July 29, 1930 |
| 2,591,578 | McNealy | Apr. 1, 1952 |
| 2,853,222 | Gallagher | Sept. 23, 1958 |
| 2,863,585 | Meshberg | Dec. 9, 1958 |
| 2,895,636 | Martin | July 21, 1959 |
| 2,899,098 | Gits | Aug. 11, 1959 |
| 2,942,301 | Price | June 28, 1960 |